United States Patent
Tsunoda

(10) Patent No.: US 9,680,631 B2
(45) Date of Patent: Jun. 13, 2017

(54) SIGNAL RECOVERY CIRCUIT AND SIGNAL RECOVERY METHOD

(71) Applicant: FUJITSU LIMITED, Kawasaki-shi, Kanagawa (JP)

(72) Inventor: Yukito Tsunoda, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/812,281

(22) Filed: Jul. 29, 2015

(65) Prior Publication Data
US 2016/0065316 A1 Mar. 3, 2016

(30) Foreign Application Priority Data
Aug. 28, 2014 (JP) .................................. 2014-174257

(51) Int. Cl.
| | | |
|---|---|---|
| H04B 10/00 | (2013.01) | |
| H04L 7/00 | (2006.01) | |
| H04L 7/033 | (2006.01) | |
| H04B 10/54 | (2013.01) | |
| H04B 10/69 | (2013.01) | |

(52) U.S. Cl.
CPC ......... *H04L 7/0041* (2013.01); *H04B 10/541* (2013.01); *H04B 10/69* (2013.01); *H04L 7/033* (2013.01)

(58) Field of Classification Search
USPC ................................................ 398/202–214
See application file for complete search history.

(56) References Cited

U.S. PATENT DOCUMENTS

| | | | | |
|---|---|---|---|---|
| 4,611,230 A | * | 9/1986 | Nienaber | H04N 5/126 331/20 |
| 4,726,022 A | * | 2/1988 | Chan | G11B 20/182 360/51 |
| 5,920,600 A | * | 7/1999 | Yamaoka | H03L 7/0805 327/149 |
| 6,002,282 A | * | 12/1999 | Alfke | G06F 1/10 327/149 |
| 6,295,327 B1 | * | 9/2001 | Takla | H03L 7/10 327/147 |
| 6,300,838 B1 | * | 10/2001 | Kelkar | H03L 7/0891 327/156 |
| 6,347,128 B1 | * | 2/2002 | Ransijn | H03D 13/004 331/11 |

(Continued)

FOREIGN PATENT DOCUMENTS

| | | |
|---|---|---|
| JP | 2006-41818 | 2/2006 |
| JP | 2006-253808 | 9/2006 |

OTHER PUBLICATIONS

E. Haglund et al., "25 Gbit/s transmission over 500 m multimode fiber using 850 nm VCSEL with integrated mode filter", *Electronics Letters*, Apr. 26, 2012, vol. 49, No. 9, 2 pp.

*Primary Examiner* — Agustin Bello
(74) *Attorney, Agent, or Firm* — Staas & Halsey LLP

(57) ABSTRACT

A signal recovery circuit includes: a data acquisition circuit configured to collect a received data signal according to a transition edge of a received signal recovery clock; and a phase adjustment circuit configured to adjust a phase relationship between the transition edge of the received signal recovery clock and the received data signal according to a data value of the received data signal to be acquired by the data acquisition circuit.

11 Claims, 19 Drawing Sheets

(56) References Cited

U.S. PATENT DOCUMENTS

| | | | | |
|---|---|---|---|---|
| 6,392,457 B1* | 5/2002 | Ransijn | H03L 7/085 | 327/12 |
| 6,628,173 B2* | 9/2003 | Cohen | H03L 7/0891 | 327/160 |
| 6,671,074 B2* | 12/2003 | Akashi | H04B 10/69 | 375/375 |
| 6,684,033 B1* | 1/2004 | Doh | H04B 10/6931 | 375/225 |
| 6,807,245 B2* | 10/2004 | Ibukuro | H04L 7/033 | 375/215 |
| 6,850,584 B2* | 2/2005 | Kogure | H03L 7/087 | 327/147 |
| 6,901,126 B1* | 5/2005 | Gu | H03L 7/0998 | 375/354 |
| 6,937,685 B2* | 8/2005 | Tang | H03L 7/081 | 375/376 |
| 6,973,147 B2* | 12/2005 | Christensen | H03L 7/087 | 375/354 |
| 7,020,401 B2* | 3/2006 | Sakano | H03L 7/087 | 327/156 |
| 7,027,544 B2* | 4/2006 | Vaucher | H03L 7/089 | 327/291 |
| 7,167,533 B2* | 1/2007 | Glenn | H04L 7/0337 | 375/355 |
| 7,307,461 B2* | 12/2007 | Nguyen | G11C 7/1078 | 327/171 |
| 7,428,284 B2* | 9/2008 | Lin | H03D 13/004 | 327/112 |
| 7,489,757 B2* | 2/2009 | Totsuka | H03L 7/07 | 375/354 |
| 7,873,132 B2* | 1/2011 | Desai | H03L 7/0814 | 375/354 |
| 7,983,368 B2* | 7/2011 | Cranford, Jr. | H04L 7/042 | 327/158 |
| 8,520,793 B2* | 8/2013 | Lin | H04L 7/033 | 375/224 |
| 8,538,271 B2* | 9/2013 | Effenberger | H04B 10/695 | 375/360 |
| 8,644,713 B2* | 2/2014 | Poulsen | H04B 10/801 | 398/154 |
| 8,804,892 B2* | 8/2014 | Kyles | H03L 7/07 | 327/141 |
| 9,419,783 B1 | 8/2016 | Wang | H04L 7/0054 | |
| 2002/0021153 A1* | 2/2002 | Saeki | H03K 5/133 | 327/163 |
| 2002/0153930 A1* | 10/2002 | Singor | G06F 1/08 | 327/172 |
| 2002/0154373 A1* | 10/2002 | Akashi | H04B 10/69 | 398/202 |
| 2002/0191723 A1* | 12/2002 | Fujita | H03L 7/06 | 375/371 |
| 2003/0039328 A1* | 2/2003 | Tomofuji | H03K 5/1565 | 375/354 |
| 2003/0227989 A1* | 12/2003 | Rhee | H03L 7/07 | 375/376 |
| 2004/0042578 A1* | 3/2004 | Christensen | H03L 7/087 | 375/376 |
| 2004/0109520 A1* | 6/2004 | Hsu | H03K 5/1504 | 375/376 |
| 2004/0146131 A1* | 7/2004 | Wilson | H03D 13/003 | 375/375 |
| 2004/0161068 A1* | 8/2004 | Zerbe | G11C 7/22 | 375/355 |
| 2005/0058233 A1* | 3/2005 | Nguyen | G11C 7/1078 | 375/354 |
| 2005/0213696 A1* | 9/2005 | Totsuka | H03L 7/07 | 375/376 |
| 2006/0018407 A1* | 1/2006 | Osaka | H03K 5/135 | 375/316 |
| 2006/0220720 A1* | 10/2006 | Freyman | H03K 6/04 | 327/247 |
| 2006/0280272 A1* | 12/2006 | Stojanovic | H04L 7/0334 | 375/355 |
| 2008/0137790 A1* | 6/2008 | Cranford | H04L 7/0334 | 375/357 |
| 2009/0060107 A1* | 3/2009 | Fischer | H04L 7/08 | 375/355 |
| 2009/0208226 A1* | 8/2009 | Gao | H03L 7/089 | 398/202 |
| 2010/0054760 A1* | 3/2010 | Fukuda | H03D 13/003 | 398/202 |
| 2011/0025913 A1* | 2/2011 | Sugiyama | H03L 7/0807 | 348/500 |
| 2011/0116810 A1* | 5/2011 | Poulsen | H04B 10/801 | 398/202 |
| 2012/0020677 A1* | 1/2012 | Noguchi | H03L 7/0816 | 398/202 |
| 2014/0064744 A1* | 3/2014 | Yoshiyama | H04B 10/60 | 398/202 |
| 2014/0147130 A1* | 5/2014 | Poulsen | H04B 10/801 | 398/208 |
| 2016/0065316 A1* | 3/2016 | Tsunoda | H04B 10/541 | 398/155 |

* cited by examiner

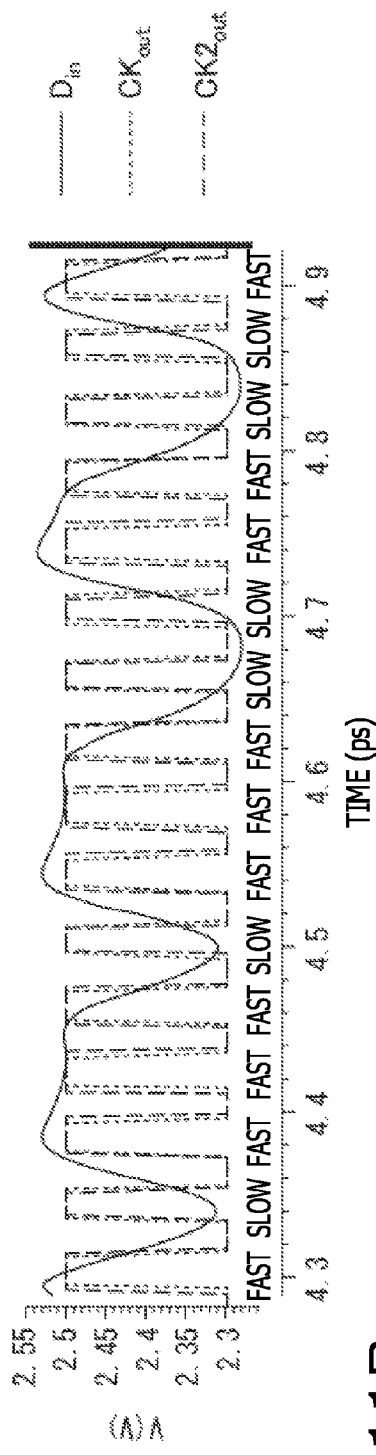
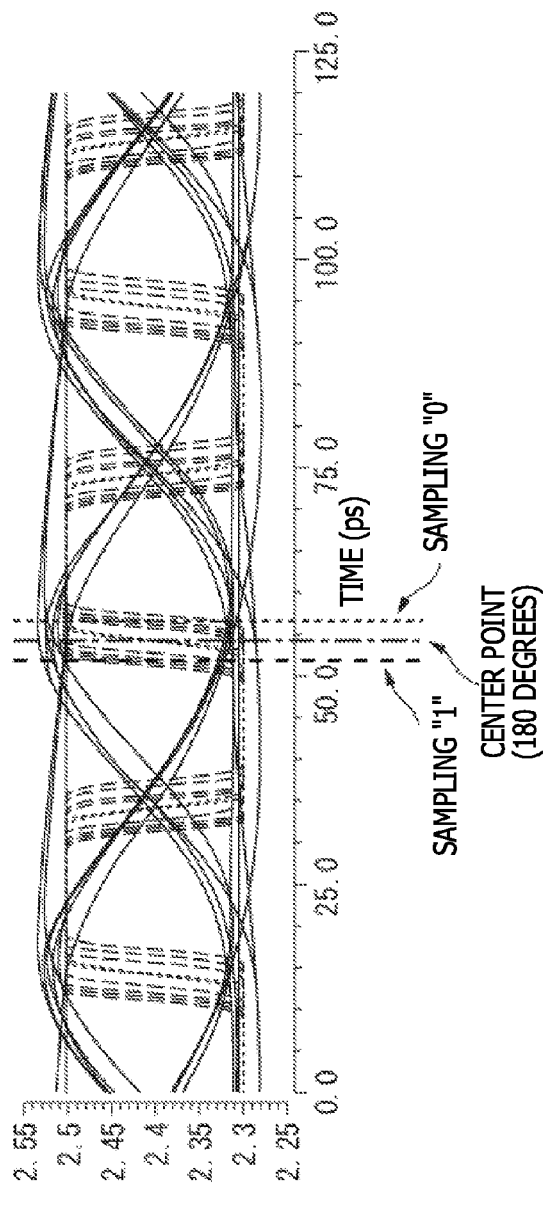
FIG. 11A
FIG. 11B

Tr: RISING TIME
Tf: FALLING TIME
UI: TIME OF 1UI
Dj: FIXED JITTER (PATTERN JITTER)

Ns:NOISE
Rj:RANDOM JITTER
   (JITTER CAUSED BY NOISE IN RISING AND FALLING)
Dj:PATTERN JITTER
   (TIMING DIFFERENCE CUASED BY SIGNAL PATTERN IN RISING AND FALLING)
Dc:DUTY DEVIATION

SIGNAL RECOVERY CIRCUIT AND SIGNAL RECOVERY METHOD

CROSS-REFERENCE TO RELATED APPLICATION

This application is based upon and claims the benefit of priority of the prior Japanese Patent Application No. 2014-174257 filed on Aug. 28, 2014, the entire contents of which are incorporated herein by reference.

FIELD

The embodiments discussed herein are related to a signal recovery circuit and a signal recovery method.

BACKGROUND

Improvement in the performance of information processing apparatuses, such as apparatuses or servers for communication infrastructure, necessarily involves a high data rate for signal transmission/reception in and out of the apparatuses. In a communication system that performs data signal transmission/reception, a data acquisition circuit (e.g., a flip-flop circuit) in a signal recovery circuit acquires a transmitted data signal according to a received signal recovery clock in order to perform the signal recovery. As a received signal recovery clock, a clock recovered from a received data signal by a clock and data recovery (CDR) circuit is generally used. The received signal recovery clock may also be generated by adjusting the phase of a clock generated in the signal recovery circuit to follow the intermediate phase of a transition edge of the received data signal. In the following, a case where a clock recovered by the CDR circuit for use as a received signal recovery clock will be described by way of example.

In the signal recovery circuit, the data acquisition circuit (e.g., a flip-flop circuit) acquires a received data signal according to a received signal recovery clock recovered by the CDR circuit in order to perform a signal recovery. Since the uttering of phase direction is eliminated by performing the acquisition according to the received signal recovery clock, this operation is called retiming as well. In retiming, sampling (acquisition) is performed according to the received signal recovery clock rising at the center of a transition edge of the received data signal, i.e., at a phase differed 180 degrees relative to the transition edge to determine whether the received data is 0 or 1.

In an optical communication system, an optical signal is generated by directly modulating a laser diode (LD) provided in a transmitter by a transmitted data signal. The optical signal is transmitted to a receiver via an optical cable, and a photodetector (PD) in the receiver converts the optical signal into a received data signal in the form of an electric signal. A signal recovery circuit in the receiver recovers a received signal recovery clock signal from the received data signal and performs the retiming on the received data signal according to the recovered received signal recovery clock signal.

The optical signal generated by directly modulating the LD asymmetrically rises and falls due to the characteristic nature of the LD. Specifically, the optical signal transitions faster when a transmitted data signal rises from 0 to 1 than when the transmitted data signal falls from 1 to 0. In other words, the optical signal transitions faster from a low strength level to a high strength level and transitions slower from a high strength level to a low strength level. Thus, the received signal also transitions faster when rising from 0 to 1 and transitions slower when falling from 1 to 0.

However, the signal recovery circuit of the optical communication system as above has performed retiming by a received signal recovery clock that rises at a phase differed 180 degrees from the transition edge of the received data signal regardless of the received data.

As described above, although rises and falls in the received data signal are asymmetric, retiming had been performed by the received signal recovery clock that rises at a phase differed 180 degrees from the transition edge of the received data signal. Thus, the transition edge of the received signal recovery clock interferes with the rising and falling of the received data signal, thereby causing an error in the received data.

In the above, a case where a received data signal rises fast and falls slow is described by way of example. The same problem as above also occurs in a reverse case, i.e., where the received data signal rises slow and falls fast.

The following are reference documents.
  [Document 1] Japanese Laid-Open Patent Publication No. 2006-253808,
  [Document 2] Japanese Laid-Open Patent Publication No. 2006-041818,
  [Document 3] E. Haglund, et al,"25 Gbit/s transmission over 500 m multimode fiber using 850 nm VCSEL with integrated mode filter", ELECTRONICS LETTERS 26 Apr. 2012, Vol. 49, No. 9.

SUMMARY

According to an aspect of the invention, a signal recovery circuit includes: a data acquisition circuit configured to collect a received data signal according to a transition edge of a received signal recovery clock; and a phase adjustment circuit configured to adjust a phase relationship between the transition edge of the received signal recovery clock and the received data signal according to a data value of the received data signal to be acquired by the data acquisition circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11A illustrates examples of a received data signal, a received signal recovery clock, and an adjustment-completed received signal recovery clock at one time;

FIG. 11B illustrates modified examples of the same at different times in a superposed manner;

DESCRIPTION OF EMBODIMENTS

Before describing exemplary embodiments, an optical communication system will be described by way of example in relation to a general communication system and a general signal recovery circuit.

Figure 1:
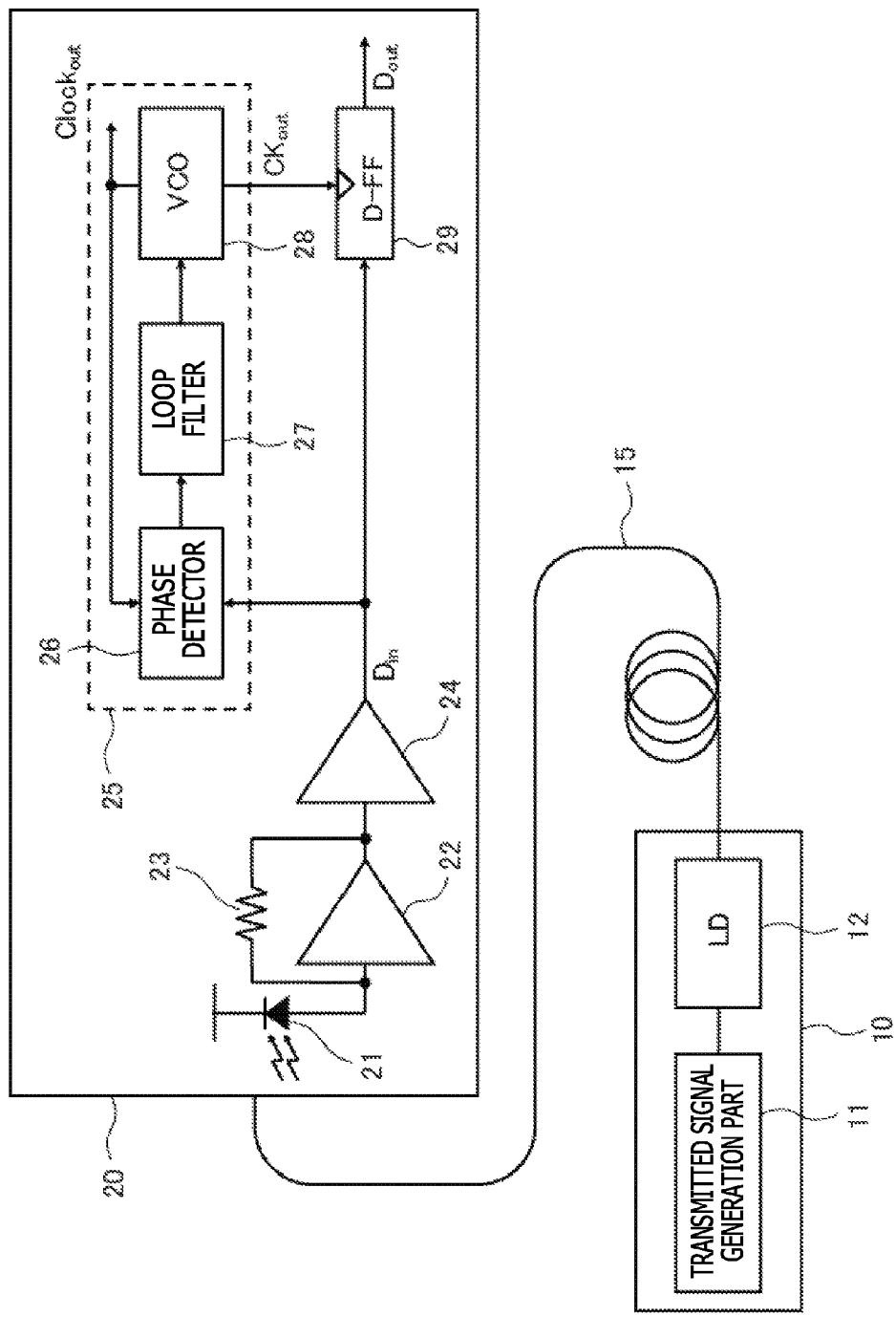
FIG. 1 illustrates an exemplary configuration of an optical communication system.

FIG. 1 illustrates an exemplary configuration of an optical communication system. Although drawings, including FIG. 1, represent that an electrical signal has a single phase, the electrical signal used in the exemplary embodiments is not limited to a single phase electrical signal and may be a differential electrical signal. At a high data rate, a differential electrical signal may be used. In order to facilitate the illustration, however, block diagrams illustrating a configuration shows an example that use a single phase electrical signal, and shows an example that use a differential electrical signal only when illustrating a specific circuit.

The optical communication system includes a transmitter 10, a receiver 20, and an optical cable 15 for transmitting an optical signal outputted from the transmitter 10 to the receiver 20. The transmitter 10 includes a transmitted signal generation part 11 configured to generate a transmitted signal and a laser diode (LD) 12 modulated directly by the transmitted signal to output an optical signal corresponding to the transmitted signal to an optical cable 15. As described above, the optical signal outputted from the directly modulated LD 12 shows asymmetric rises and falls, and transitions faster when a transmitted data signal rises from 0 to 1 than when the transmitted data signal falls from 1 to 0.

The receiver 20 includes a photodiode (PD) 21, a trans-impedance amplifier (TIA) 22, a resistor 23 added to the TIA, an amplifier circuit 24, a clock data recovery (CDR) circuit 25, and an acquisition circuit (D-FF) 29. The PD 21 receives an optical signal from the optical cable 15 and converts the optical signal into an electrical signal. The TIA 22 and the resistor 23 amplify the PD 21 to generate a received data signal. The amplifier circuit 24 further amplifies the signal amplified by the TIA 22 to output a stable received data signal $D_{in}$ suitable for a rear end processing.

The CDR circuit 25 includes a phase detector 26, a loop filter 27, and a voltage controlled oscillator (VCR) 28. The CDR circuit 25 recovers a clock contained in a received data signal, i.e., a transmission clock, from a change in the received data signal, to output as a recovery clock $Clock_{out}$, along with a received signal recovery clock $CK_{out}$ that is phase-differed 180 degrees relative to the recovery clock. The configuration and operation of the CDR circuit 25 has been well known and thus descriptions thereof will be omitted.

The acquisition circuit 29 is a D-type flip-flop (D-FF) and, at the timing of the rising of the received signal recovery clock $CK_{out}$, performs a sampling (acquisition) of the received data signal $D_{in}$, i.e., retiming, to finally determine whether the received data signal is 0 or 1. The acquisition circuit 29 outputs the determined value as output data $D_{out}$.

Figure 2A:
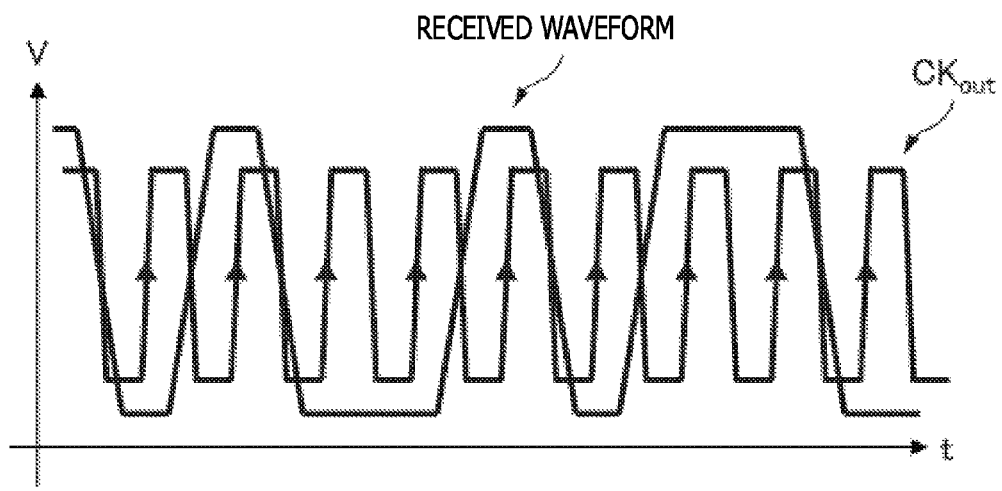
FIG. 2A illustrates exemplary signal waveforms of a received signal and a recovery clock.
Figure 2B:
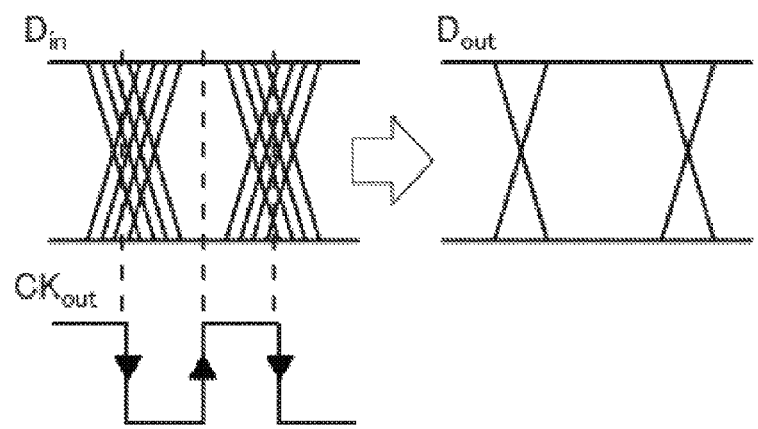
FIG. 2B illustrates exemplary waveforms of a received data signal, a received signal recovery clock and output data.

FIG. 2 illustrates an exemplary signal waveform in each part of the receiver, and specifically FIG. 2A illustrates a received signal and a recovery clock $ClockD_{out}$ and FIG. 2B illustrates exemplary waveforms of a received data signal $D_{in}$, a received signal recovery clock $CK_{out}$, and output data $D_{out}$.

In a conventional electrical signal transmission system, a received signal and a received data signal $D_{in}$ are symmetric. Also, in an optical communication system, it is general that the CDR circuit 25 and the acquisition circuit 29 generate a received signal and a received data signal $D_{in}$ to be symmetric. FIG. 2 also illustrates a case where a received signal and a received data signal $D_{in}$ are generally symmetric.

According to the waveform of the received signal illustrated in FIG. 2A, the received data signal transitions from 1, 0, 1, 0, 0, 1, 0, 1, 1, and 0. The received signal recovery clock $CK_{out}$ is generated such that the clock begins to rise at a phase of 180 degrees when the transition edge of the received data signal is at 0 degree (360 degrees).

FIG. 2B illustrates the above phase relationship in more detail. The received data signal $D_{in}$ is changed in the transition edge due to a jittering, while the received signal recovery clock $CK_{out}$ falls at an average phase of the transition edge of the received data signal $D_{in}$. Thus, the received signal recovery clock $CK_{out}$ rises at a phase differed 180 degrees from the transition edge of the received data signal $D_{in}$, at which the received data signal $D_{in}$ is stable, i.e., when the eye pattern is widest, and then $D_{in}$ is determined. In other words, the received data signal $D_{in}$ may be kept stable at a high level or low level before and after the received signal recovery signal $CK_{out}$ rises. An error may occur if the received data signal $D_{in}$ is not kept fully stable.

As described above, however, in the optical communication system that directly modulates the LD, a received signal and a received data signal $D_{in}$ are asymmetric.

Figure 3A:
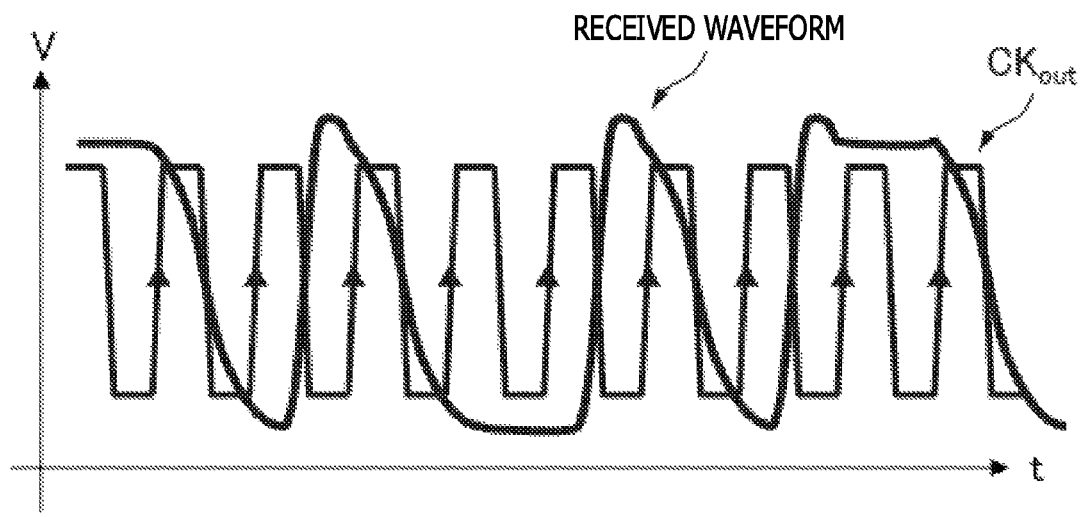
FIG. 3A illustrates exemplary signal waveforms of the received signal and a received signal recovery clock
Figure 3B:
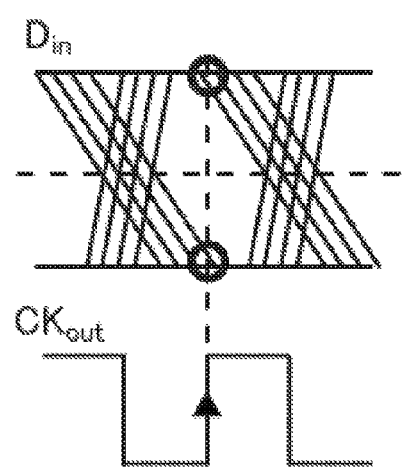
FIG. 3B illustrates exemplary waveforms of the received data signal and the received signal recovery clock.

FIG. 3 illustrates exemplary signal waveforms of a received signal and a received data signal $D_{in}$ when these signals are asymmetric, and specifically FIG. 3A illustrates the received signal and a received signal recovery clock $CK_{out}$ and FIG. 3B illustrates exemplary waveforms of the received data signal $D_{in}$ and the received signal recovery clock $CK_{out}$.

As illustrated in FIGS. 3A and 3B, the received signal (received waveform) and the received data signal $D_{in}$ is asymmetric, and rising is faster than falling. Thus, in the transition of the received data signal $D_{in}$ from 1 to 0, the received signal recovery clock $CK_{out}$ may rise before the received data signal $D_{in}$ begins to change into 0 (low level). Also, in the transition of the received data signal $D_{in}$ from 0 to 1, the received data signal $D_{in}$ transitions to 1 (to a high level) and then may begin to transition to 0 before the received signal recovery clock $CK_{out}$ rises. In that event, it is highly likely that an error occurs in the received data, thereby increasing the error rate.

As illustrated in FIG. 3B, in the optical communication system that directly modulate the LD, the received data signal $D_{in}$ rises and falls asymmetrically, and the optimum timing of rising from 0 to 1 and the optimum timing of falling from 1 to 0 are different. Specifically, the optimum timing of rising from 0 to 1 is faster than a phase of 180 degrees and the optimum timing of falling from 1 to 0 is slower than a phase of 180 degrees. Thus, if the timing differed 180 degrees from the transition edge of the received data signal $D_{in}$ is set as a rise of the received signal recovery clock $CK_{out}$, i.e., as a sampling point, an interference with the rising and falling of the received data signal $D_{in}$ may occur and lead to the occurrence of an error.

In the above exemplary optical communication system that directly modulates the LD, the received data signal rises fast and falls slow. However, in an inverse signal or in another system, the received data signal may rise slow and fall fast. In such a case, the same problem as above will also occur.

A signal recovery circuit according to exemplary embodiments described below performs retiming at an appropriate timing according to the transitional characteristic of a received data signal, thereby reducing the occurrence of errors.

Figure 4A:
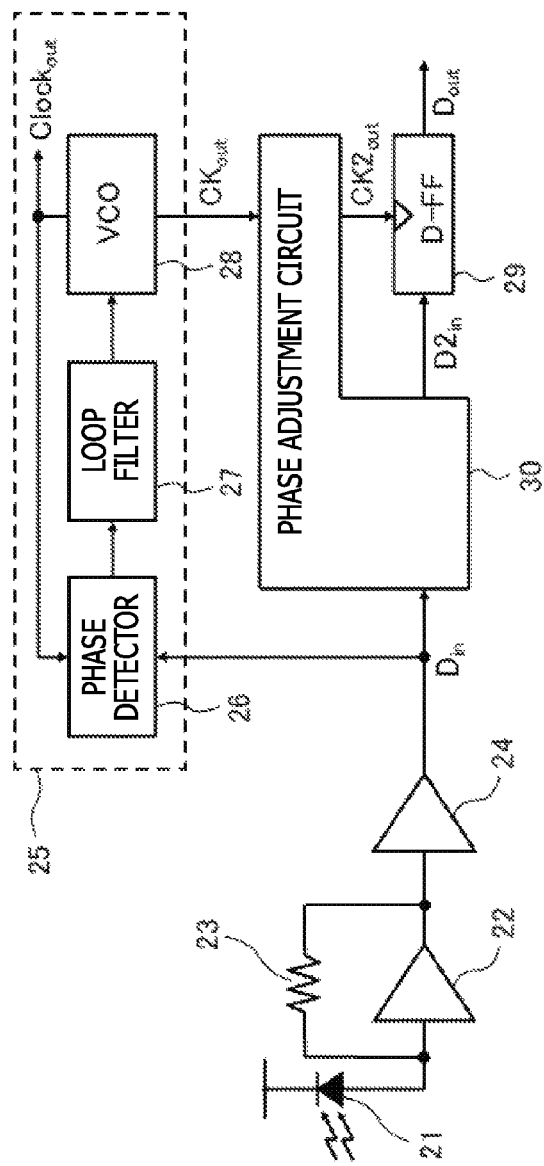
FIG. 4A illustrates a configuration of a receiver in a first exemplary embodiment.
Figure 4B:
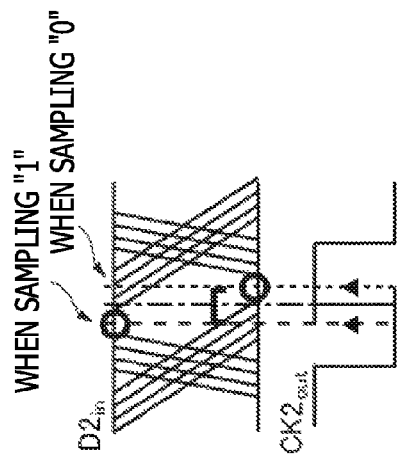
FIG. 4B illustrates timings of data acquisition of phases of an adjusted received data signal and an adjusted received signal recovery clock.

FIG. 4 illustrates a configuration of a receiver in a first exemplary embodiment, and specifically FIG. 4A illustrates the configuration and FIG. 4B illustrates a phase between an adjusted received data signal and an adjusted received signal recovery clock. The receiver in the first exemplary embodiment is used, for instance, as a receiver in an optical communication system that directly modulates an LD, as exemplified in FIG. 1.

The receiver in the first exemplary embodiment is provided with a PD 21, a TIA 22, a resistor 23, an amplifier circuit 24, a CDR circuit 25, an acquisition circuit (D-FF) 29 and a phase adjustment circuit. The CDR circuit 25 is provided with a phase detector 26, a loop filter 27 and a voltage controlled oscillator (VCO) 28. Thus, the receiver 20 in the first exemplary embodiment is similar in configuration to the receiver 20 illustrated in FIG. 1, while being different therefrom in terms of being further provided with a phase adjustment circuit 30. The remaining part of the two receivers is the same as each other.

The phase adjustment circuit adjusts the phase relationship between the received data signal $D_{in}$ and the received signal recovery clock $CK_{out}$ to allow the received signal recovery clock $CK_{out}$ to rise at the optimum timing according to the data value of the received data signal $D_{in}$ to be acquired by the acquisition circuit 29. The phase adjustment circuit outputs the received data signal $D_{in}$ as an adjustment-completed received data signal $D2_{in}$ and outputs the phase-adjusted received signal recovery clock $CK_{out}$ as an adjustment-completed received signal recovery clock $CK2_{out}$ to the acquisition circuit 29.

As illustrated in FIG. 4B, the received data signal $D_{in}$ transitions fast when the data value rises from 0 to 1 and transitions slow when the data value falls from 1 to 0. Thus, the phase adjustment circuit adjusts the phase relationship between the adjustment-completed received data signal $D2_{in}$ and the adjustment-completed received signal recovery clock $CK2_{out}$ such that the received signal recovery clock $CK_{out}$ transitioning at a phase differed 180 degrees from the transition edge of the received data signal $D_{in}$ advances when the data value rises to 1 and is delayed when the data value falls to 0. Thus, the adjustment-completed received signal recovery clock $CK2_{out}$ will rise with the received data signal $D2_{in}$ being stable and will not interfere with the rising and falling of the received data signal $D2_{in}$, thereby reducing the occurrence of errors.

In the first exemplary embodiment, the phase adjustment circuit 30 adjusts the phase relationship between the received data signal $D_{in}$ and the received signal recovery clock $CK_{out}$. An actual circuit, however, may be implemented in a simple form by being configured to adjust only one of the signals. In a second exemplary embodiment described below, the phase relationship between the received data signal $D_{in}$ and the received signal recovery clock $CK_{out}$ is adjusted by adjusting the phase of the received signal recovery clock $CK_{out}$.

Figure 5:
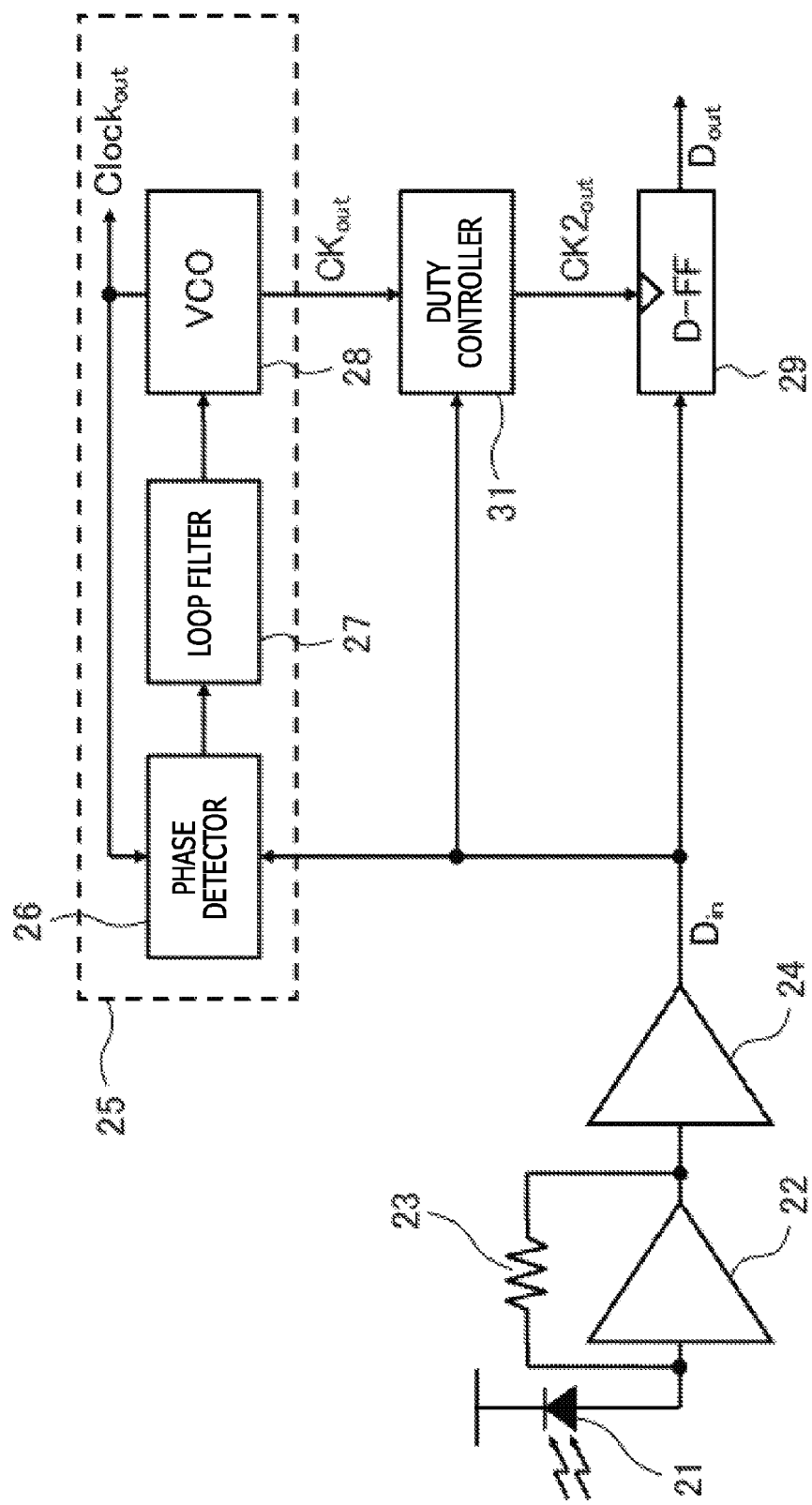
FIG. 5 illustrates a configuration of a receiver in a second exemplary embodiment.

FIG. 5 illustrates a configuration of a receiver in the second exemplary embodiment.

The receiver in the second exemplary embodiment is different from that in the first exemplary embodiment in terms of being provided with a duty controller 31 as the phase adjustment circuit 30, while being the same in the remaining part. The duty controller 31 adjusts the phase of the received signal recovery clock $CK_{out}$ such that the received signal recovery clock $CK_{out}$ rises at the optimum timing according to the data value of the received data signal $D_{in}$ to be acquired by the acquisition circuit 29. The duty controller 31 outputs the phase-adjusted received signal recovery clock $CK_{out}$ as an adjustment-completed received signal recovery clock $CK2_{out}$ to the acquisition circuit 29. Thus, the adjustment-completed received data signal $D2_{in}$ is outputted as the received data signal $D_{in}$.

Figure 6:
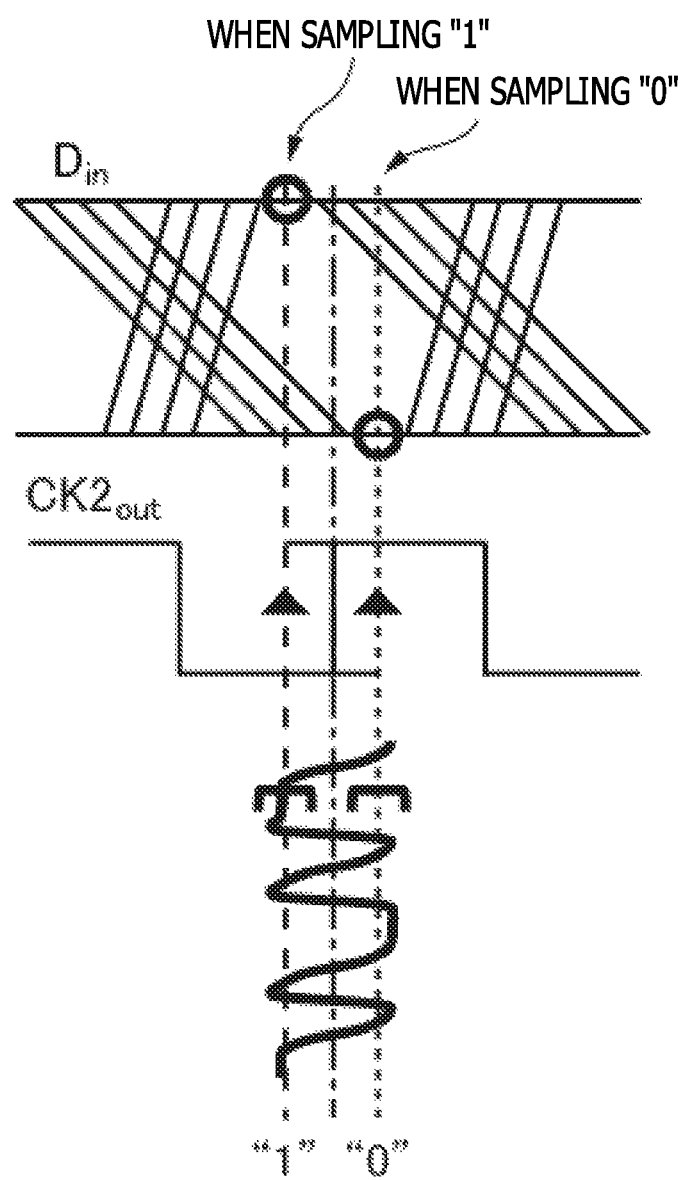
FIG. 6 illustrates a phase adjustment performed on a received signal recovery clock with respect to a received data signal.

FIG. 6 illustrates a phase adjustment performed on the received signal recovery clock $CK_{out}$ with respect to the received data signal $D_{in}$.

As illustrated in FIG. 6, the adjustment-completed received signal recovery clock $CK2_{out}$ is generated by causing the received signal recovery clock $CK_{out}$ to advance when the data value rises to 1 and delaying the received signal recover clock $CK_{out}$ when the data value falls to 0. The adjustment-completed received signal recovery clock $CK2_{out}$ will rise with the received data signal $D2_{in}$ being stable and will not interfere with the rising and falling of the received data signal $D2_{in}$, thereby reducing the occurrence of errors.

Figure 7:
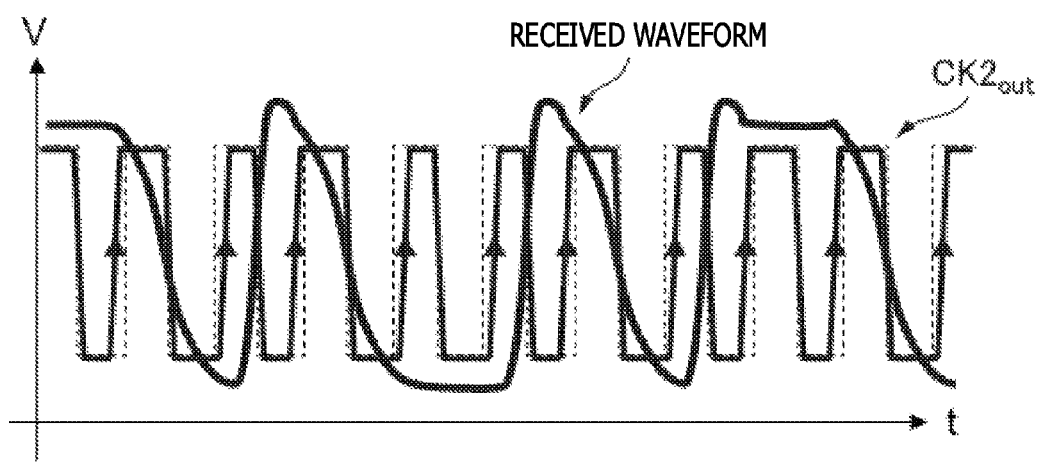
FIG. 7 illustrates waveforms of a received signal and an adjustment-completed received signal recovery clock.

FIG. 7 illustrates waveforms of the received signal and the adjustment-completed received signal recovery clock $CK2_{out}$.

FIG. 7 corresponds to FIG. 3. As illustrated in FIG. 7, when the received signal (received waveform) transitions to 1, $CK2_{out}$ rises faster than 180 degrees (indicated by a dotted line), and when the received signal transitions to 0, $CK2_{out}$ rises slower than 180 degrees.

Figure 8:
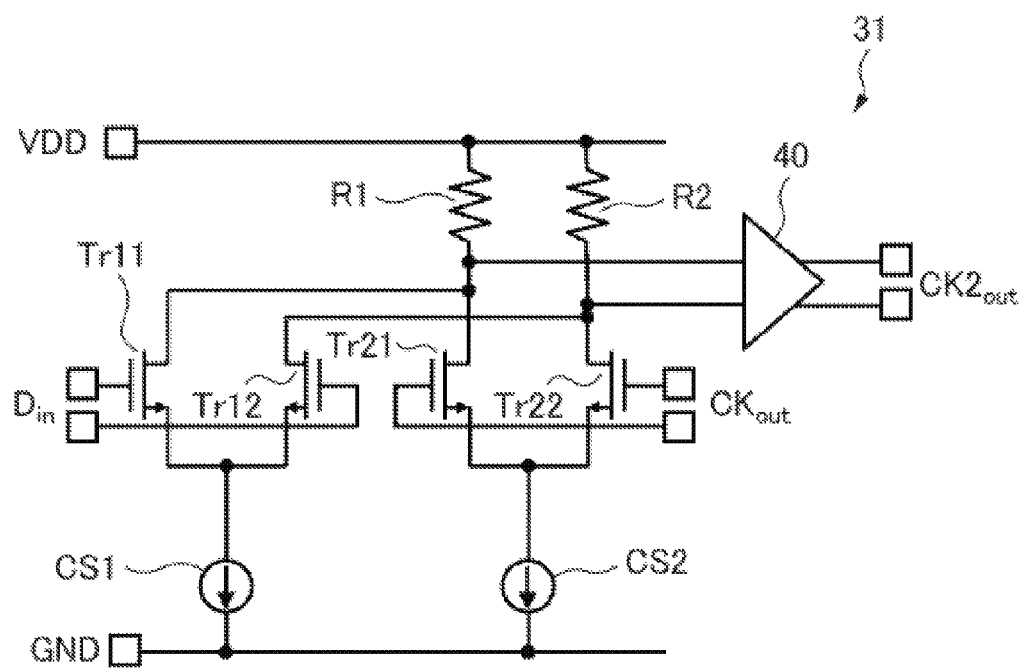
FIG. 8 is a circuit diagram of a duty controller.

FIG. 8 is a circuit diagram of the duty controller 31. As described above, an electrical signal is represented as a signal having a single phase in the drawings mentioned above for the purposes of facilitating the illustration. However, a differential electrical signal may be used. FIG. 8 illustrates a circuit diagram for a differential signal. To facilitate an understanding among those skilled in the art, however, the circuit of FIG. 8 may be represented by a circuit diagram for a single phase signal.

The duty controller 31 includes common load resistors R1 and R2, a first differential pair of transistors Tr11 and Tr12, a second differential pair of transistors Tr21 and Tr22, constant current sources CS1 and CS2, and a limit amplifier 40. The series-connected first differential pair and CS1 and the series-connected second differential pair and CS2 are connected in parallel to each other and are connected in series to R1 and R2 between power supplies VDD and GND. To the first differential pair, the received data signal $D_{in}$ is inputted, and to the second differential pair, the received signal recovery clock $CK_{out}$ is inputted. The limit amplifier 40 amplifies the potential difference at connection nodes between the two differential pairs and the common load resistors R1 and R2 to output as $CK2_{out}$.

The circuit illustrated in FIG. 8 has been well known as an analog adder for summing up the received data signal $D_{in}$ and the received signal recovery clock $CK_{out}$. The summing ratio is determined based on the ratio of the first differential pair's driving force to the second differential pair's driving force.

Figure 9:
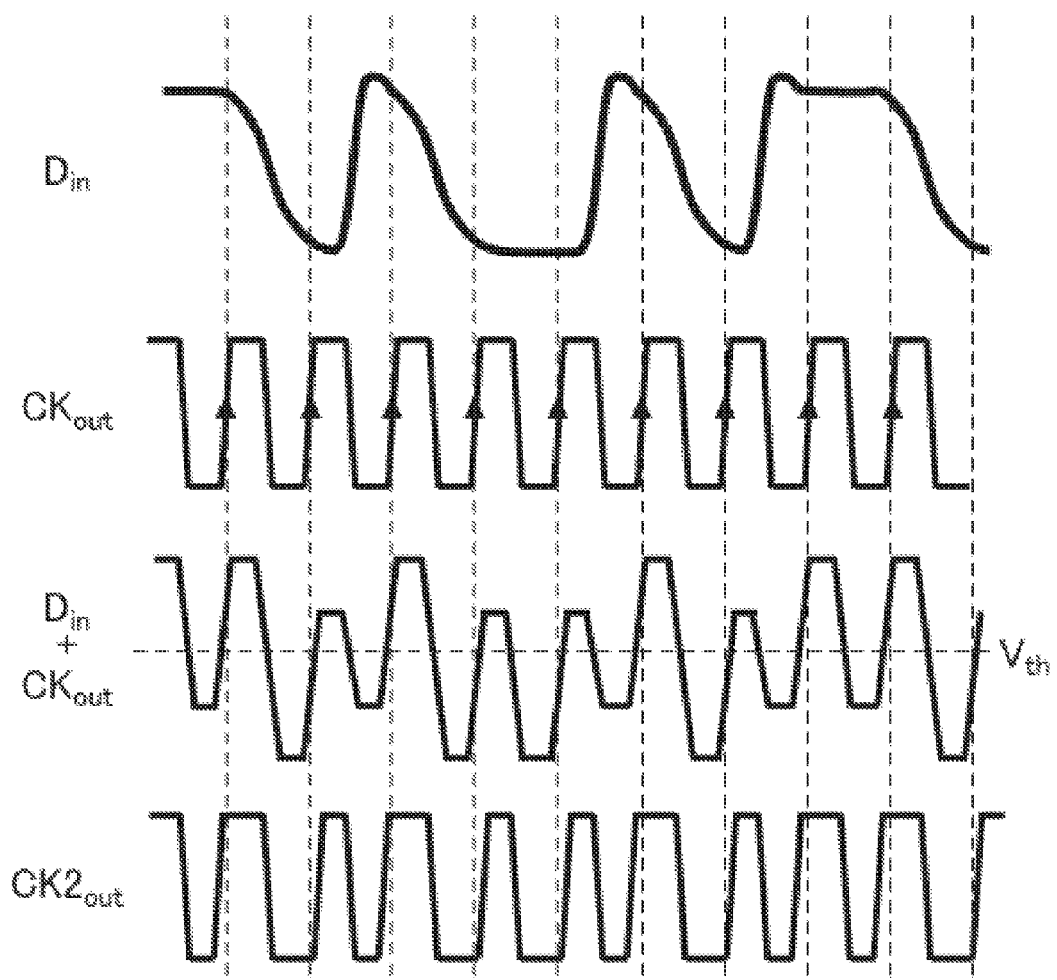
FIG. 9 is a time chart illustrating the operation of the duty controller and illustrating a received data signal, a received signal recovery clock, a summing signal, and an adjustment-completed received signal recovery clock.

FIG. 9 is a time chart illustrating the operation of the duty controller 31 and illustrates the received data signal $D_{in}$, the received signal recovery clock $CK_{out}$, the signal resulting from the summing of $D_{in}$ and $CK_{out}$ ($D_{in}+CK_{out}$), and the adjustment-completed received signal recovery clock $CK2_{out}$.

The summing signal of $D_{in}+CK_{out}$ transitions as illustrated in FIG. 9. When compared with a threshold Vth by the limit amplifier (40), the rising edge of $CK2_{out}$ as a result of comparison advances when $D_{in}$ is equal to 1 and is delayed when $D_{in}$ is equal to 0. In this way, $CK2_{out}$ is a signal resulting from a change in the duty of $CK_{out}$. Thus, the circuit illustrated in FIG. 8 is also called a duty controller.

Figure 10:
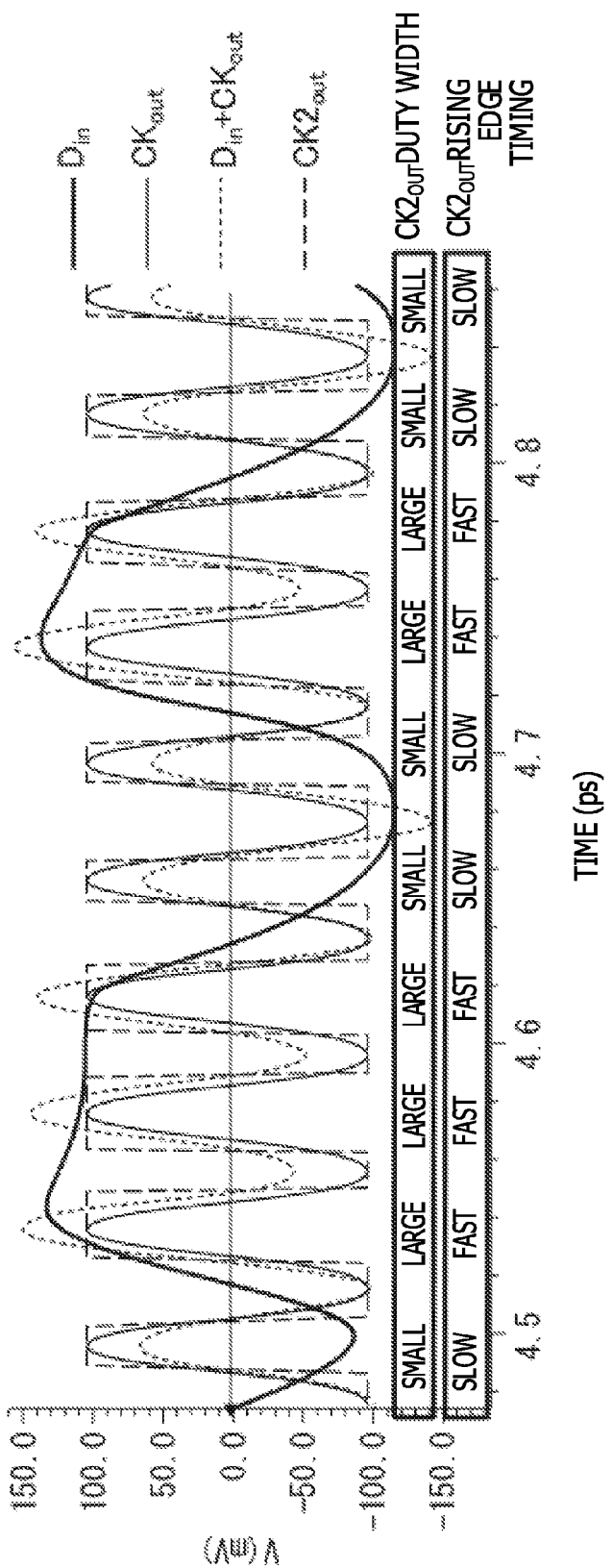
FIG. 10 illustrates a simulation result of a signal in each part of the receiver in the second exemplary embodiment when the receiver is used in an optical communication system that directly modulates the LD as illustrated in FIG. 1.

FIG. 10 illustrates a simulation result of signals in each pat of the receiver in the second exemplary embodiment in case where the receiver is used in the optical communication system that directly modulates the LD, as illustrated in FIG. 1. FIG. 10 represents the received data signal $D_{in}$, the received signal recovery clock $CK_{out}$, the summing signal of $D_{in}+CK_{out}$ and the adjustment-completed received signal recovery clock $CK2_{out}$.

As illustrated in FIG. 10, when the acquired received data signal $D_{in}$ is 1, the duty width of $CK2_{out}$ increases and therefore the timing of the rising edge of $CK2_{out}$ becomes faster. To the contrary, when the acquired received data signal $D_{in}$ is 0, the duty width of $CK2_{out}$ decreases and therefore the timing of the rising edge of $CK2_{out}$ becomes slower.

FIG. 11 illustrates the same simulation result as FIG. 10, and specifically FIG. 11A illustrates examples of a received data signal, a received signal recovery clock, and an adjustment-completed received signal recovery clock at a single time and FIG. 11B illustrates modified examples of the same at different times in a superposed manner.

FIG. 11A is the same as FIG. 10. FIG. 11B illustrates a so-called eye pattern, and the eye pattern is opened most widely in the vicinity of the center point of data (a phase of 180 degrees). Depending on the data value, however, it may be opened most widely before or after the phase of 180 degrees. As illustrated in FIG. 11B, when sampling 1, the position where the eye pattern is opened most widely is faster than 180 degrees and therefore the rising edge of the received signal recovery clock $CK_{out}$ moves to a position before 180 degrees. To the contrary, when sampling 0, the position where the eye pattern is opened most widely is slower than 180 degrees and therefore the rising edge of the received signal recovery clock $CK_{out}$ moves to a position after 180 degrees.

Herein, the effect of improving the error rate as a result of using the receiver of the second exemplary embodiment will be considered.

Figure 12:
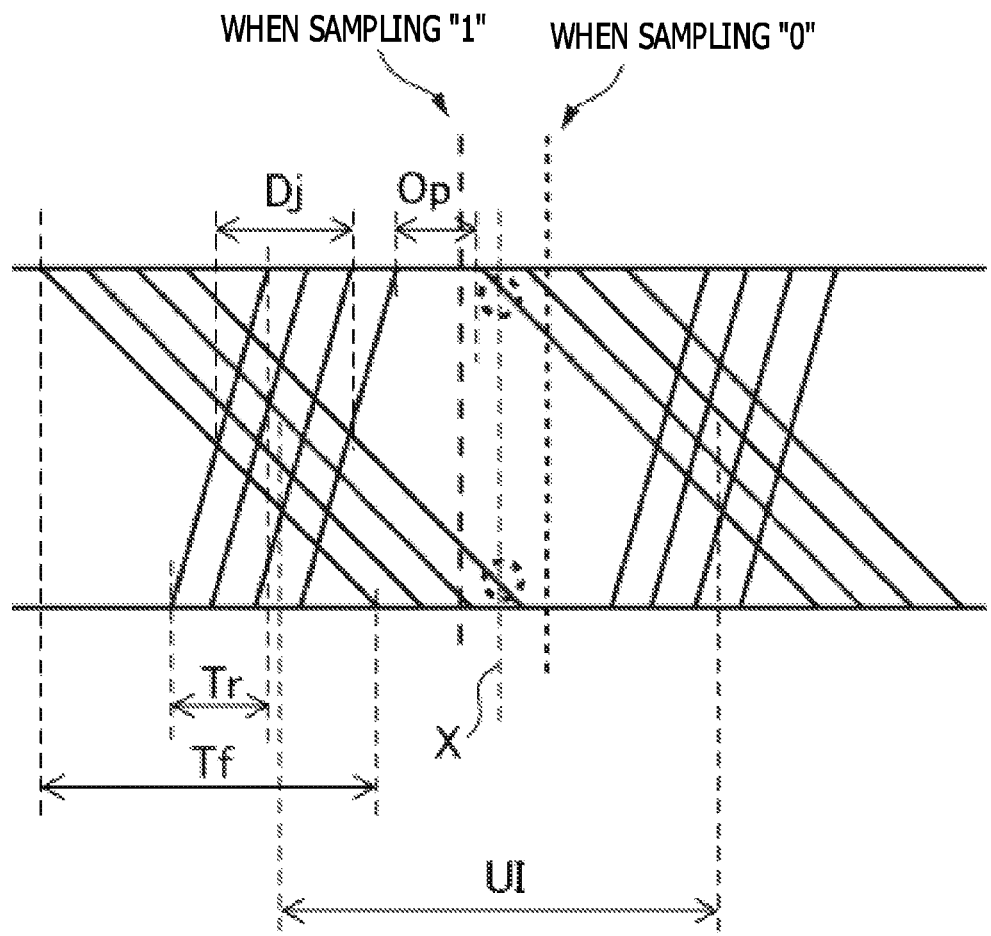
FIG. 12 illustrates transition models of a received data signal for one clock, a received signal recovery clock and an adjustment-completed received signal recovery clock.

FIG. 12 illustrates transition models of a received data signal $D_{in}$ for one clock, a received signal recovery clock $CK_{out}$ and an adjustment-completed received signal recovery clock $CK2_{out}$.

As illustrated in FIG. 12, one cycle of a received (transmitted) clock is indicated as 1UI. In the conventional communication system illustrated in FIG. 1, it is configured that the received signal recovery clock rises at the center point X of the transition edge of a received data clock. When the jitter of the received data signal is Dj, the sum of Dj and the time when the received data signal rises from 0 to 1 is the rising time Tr and the sum of Dj and the time when the received data signal falls from 1 to 0 is the falling time Tf.

As illustrated in FIG. 12, when the jitter is also considered, the period Op during which the received data signal is kept stable at 1 or 0 is represented by the following equation.

$$Op=UI-Dj-(Tr+Tf)/2$$

As illustrated in FIG. 12, the position of an Op during which the received data signal is 1 and the position of an Op during which the received data signal is 0 are offset from each other. In the first and second exemplary embodiments, the adjustment-completed received signal recovery clock is phase-adjusted to rise during the Op according to the data value of the received data signal.

In the conventional communication system illustrated in FIG. 1, the received signal recovery clock rises at the center point X in the transition edge of the received signal data, while the timing is not the Op. Specifically, when the received data signal transitions to 0, the received signal recovery clock rises before the Op, and when the received data signal transitions to 1, the received signal recovery clock rises after the Op. For instance, in a fall (transition to 0), the ratio of the amount of interference A where an unadjusted received signal recovery clock rises to the period Tf taken until the received signal recovery clock falls to 0 after rising may be represented as seen below.

$$A=(Tf+Dj-UI)/Tf$$

When A has a negative value, it means that the amount of interference is equal to zero.

For instance, in a received signal of 25 Gb/s (1UI=40 ps), a VCSEL corresponding to the basic level of 25 Gb/s (Tr and Tf of 20% to 80% are 14 ps and 22 ps, receptively, and Dj is 6 ps) is considered. In this case, Tr and Tf of 0% to 100% are 23.3 ps and 36.7 ps, the Op is equal to 10 ps and large enough relative to the jitter of the recovery clock, and A is equal to 0.074. Therefore, the VCSEL's waveform penalty of 10 log (1/(1-0.074))) is equal to 0.33 dB. This corresponds to deterioration caused by an error when rising at the center point X of the transition edge of the received data signal.

As described above, in the first and second exemplary embodiments, the adjustment-completed received signal recovery clock is phase-adjusted to rise during the Op according to the data value of the received data signal. Thus, the penalty is equal to zero and the error rate is improved by 0.33 dB.

In the second exemplary embodiment, since the timing for rising of the adjustment-completed received signal recovery clock varies depending on the data value of the received data signal, the phase of output data $D_{out}$ outputted from the acquisition circuit 29 changes. In other words, the duty of the output data $D_{out}$ changes and restricts the circuit operation at the rear end. In a third exemplary embodiment described below, output data with a constant duty is outputted.

Figure 13:
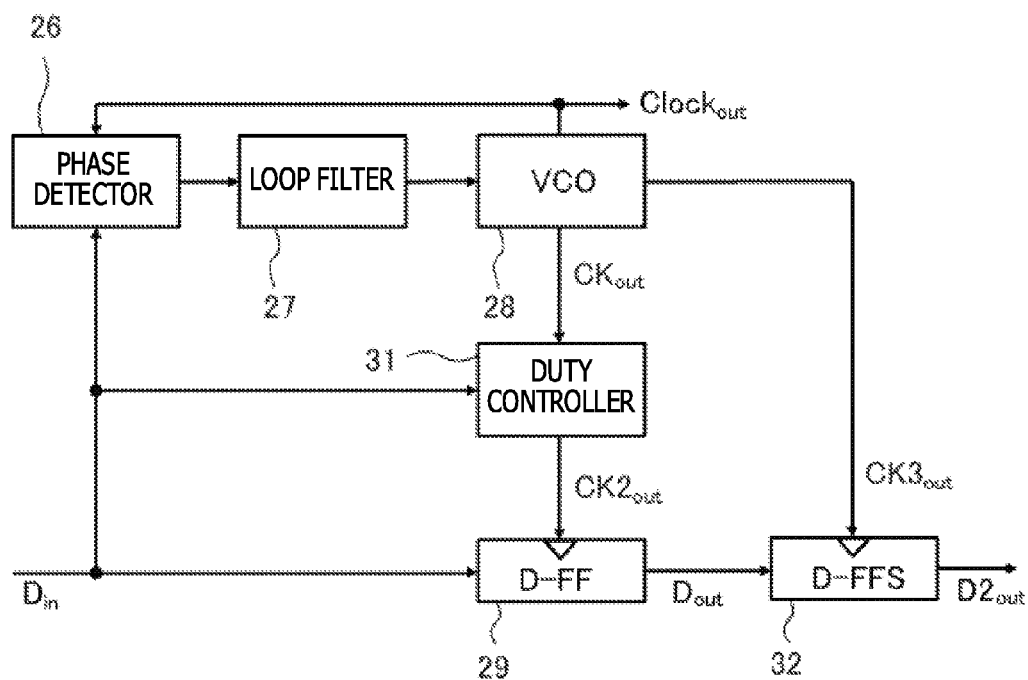
FIG. 13 illustrates a configuration of a signal recovery circuit in a receiver of a third exemplary embodiment.

FIG. 13 illustrates a configuration of a signal recovery circuit in a receiver of the third exemplary embodiment.

The signal recovery circuit in the receiver of the third exemplary embodiment is different from that of the second embodiment in terms of being provided with a readjustment circuit (D-FFS) 32, while being the same in the remaining part.

The readjustment circuit (D-FFS) 32 is a D-type flip-flop (D-FF), and at the rising timing of the re-retime clock $CK3_{out}$ from the VCO 28, latches (acquires) the output data $D_{out}$ outputted from the acquisition circuit 29. The received data signal $D_{in}$ has already been finally determined at the acquisition circuit 29 and may be appropriately acquired from the re-retime clock $CK3_{out}$, thereby outputting adjusted output data $D2_{out}$ having a constant duty.

Figure 14:
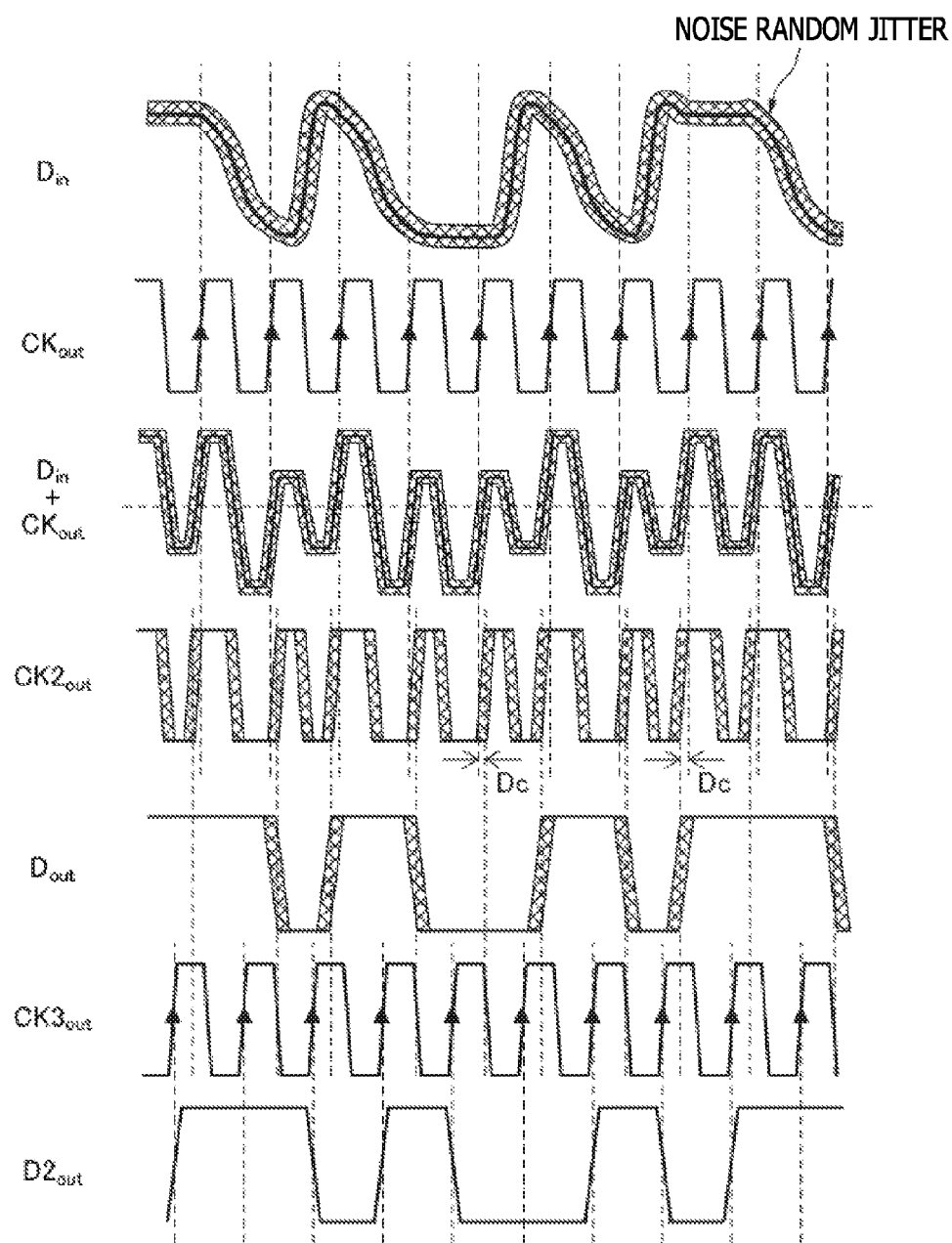
FIG. 14 is a time chart illustrating waveforms of the operation of the receiver in the third exemplary embodiment when the jitter portion is also considered.

FIG. 14 is a time chart illustrating operation waveforms in the receiver of the third exemplary embodiment in which the jittering is also considered.

$D_{in}$, $CK_{out}$, $D_{in}+CK_{out}$ and $CK2_{out}$ in FIG. 14 are the same as in FIG. 9, except that jitter is added thereto. The output data $D_{out}$ has jitter because $CK2_{out}$ has jitter which is induced by duty controller 31. In other words, this jitter of $CK2_{out}$ is a regular pattern. $CK3_{out}$ is a clock having no jitter and the readjustment circuit (D0FFS) 32 is configured to perform retiming according to $CK3_{out}$, so that the adjusted output data $D2_{out}$ is outputted as a signal having no jitter.

Figure 15:
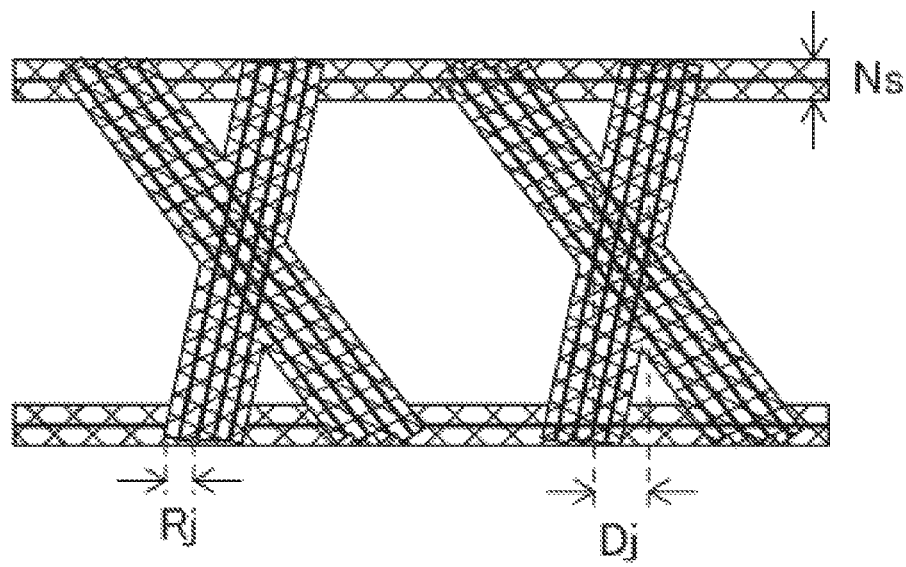
FIG. 15 illustrates a model of jitter and noise included in the received data signal.

FIG. 15 illustrates a model of jitter and noise included in a received data signal. Referring to FIGS. 14-15, it will be described how to eliminate the jitter and noise at the signal recovery circuit of the third exemplary embodiment.

In FIG. 15, Ns denotes noise in relation to the signal level of the received data signal, Rj denotes random jitter caused by the rising and falling noise in a signal and Dj denotes pattern jitter, which is a timing difference caused by rising and falling signal patterns, as described above. Although not illustrated, the duty deviation is denoted by Dc.

As described above, in the second and third exemplary embodiments, when performing retiming on the received data signal $D_{in}$, the adjustment-completed received signal recovery clock $CK2_{out}$, which is generated by summing up the received data signal $D_{in}$ and the received signal recovery clock $CK_{out}$, is used. As a result of adding the received data signal $D_{in}$, the received data signal's pattern jitter Dj and the random jitter Rj are superimposed in the adjustment-completed received signal recovery clock $CK2_{out}$. However, it is possible to advance the timing in case of 1 and delay the timing in case of 0.

The output data $D_{out}$ recovered by the adjustment-completed received signal recovery clock $CK2_{out}$ has no noise Ns because the noise has been eliminated. However, it is still affected by the pattern jitter Dj and the random jitter Rj superimposed on the adjustment-completed received signal recovery clock $CK2_{out}$ and the duty deviation Dc caused due to the adjustment of the timing.

The re-retime clock $CK3_{out}$ is a clock having no jitter and not adjusted in duty. Thus, by performing retiming once again in $CK3_{out}$, it is possible to obtain adjusted output data $D2_{out}$, from which the pattern jitter Dj, the random jitter Rj and the duty deviation Dc generated on the output data $D_{out}$ have been eliminated.

In the second and third exemplary embodiments, the duty controller 31 adjusts the phase of the received signal recovery clock $CK_{out}$ according to the received data value of the received data signal to generate the adjustment-completed received signal recovery clock $CK_{out}$. However, another method may be used to adjust the phase of the received signal recovery clock $CK_{out}$. In a fourth exemplary embodiment described below, the phase of the received signal recovery clock $CK_{out}$ may be adjusted by another method.

Figure 16:
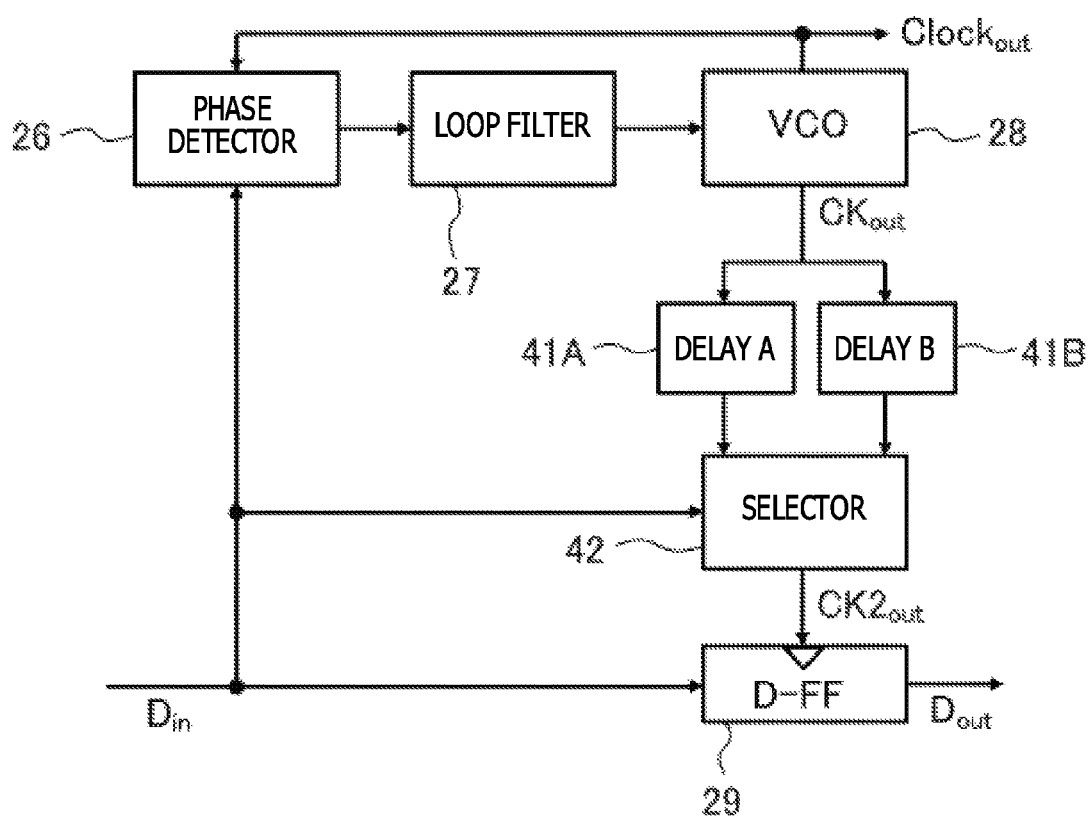
FIG. 16 illustrates a configuration of a signal recovery circuit in a receiver of a fourth exemplary embodiment.

FIG. 16 illustrates a configuration of a signal recovery circuit in a receiver of the fourth exemplary embodiment.

The signal recovery circuit of the fourth exemplary embodiment is different from that of the second exemplary embodiment in terms of being provided with a delay A 41A, a delay B 41B and a selector 42, instead of the duty controller 31, while being the same in the remaining part.

The delay A (41A) delays a received signal recovery clock $CK_{out}$ by a delayed amount A to output a first delayed received signal recovery clock. The delay B 41B delays the received signal recovery clock $CK_{out}$ by a delayed amount B greater than the delayed amount A to output a second delayed received signal recovery clock. The difference between the delayed amount A and the delayed amount B is, for example, a time difference between the time when sampling 1 and the time when sampling 0 as illustrated in FIG. 6. The delay A 41A and the delay B 41B are implemented in the form of signal lines and are configured such that a difference in length between the signal lines corresponds to a difference between the delayed amount A and the delayed amount B.

According to the data value of a received data signal $D_{in}$, the selector 42 selects any of the first delayed received signal recovery clock outputted from the delay A 41A and the second delayed received signal recovery clock outputted from the delay B 41B, and output selected delayed received signal recovery clock as an adjustment-completed received signal recovery clock $CK2_{out}$. Specifically, when the data value of the received data signal $D_{in}$ desired to be received is equal to 1, the first delayed received signal recovery clock is selected and the data value is equal to 0, the second delayed received signal recovery clock is selected. The circuit configuration of the selector 42 will be described below.

The signal recovery circuit of the fourth exemplary embodiment is different in circuit configuration from that of the second exemplary embodiment while resulting in the same effect as that of the second exemplary embodiment. Also, the signal recovery circuit of the fourth exemplary embodiment may be provided with a readjustment circuit (D-FFS) 32, as in the signal recovery circuit of the third exemplary embodiment.

In the second to fourth exemplary embodiments, a circuit that adjusts the phase of the received signal recovery clock $CK_{out}$ according to the data value received by the received data signal is used as a phase adjustment circuit. However, the phase of the received data signal $D_{in}$ may be adjusted. In a fifth exemplary embodiment described below, the phase of $D_{in}$ and $CK_{out}$ is adjusted by adjusting the phase of a received data signal $D_{in}$ without adjusting the phase of a received signal recovery clock $CK_{out}$.

Figure 17:
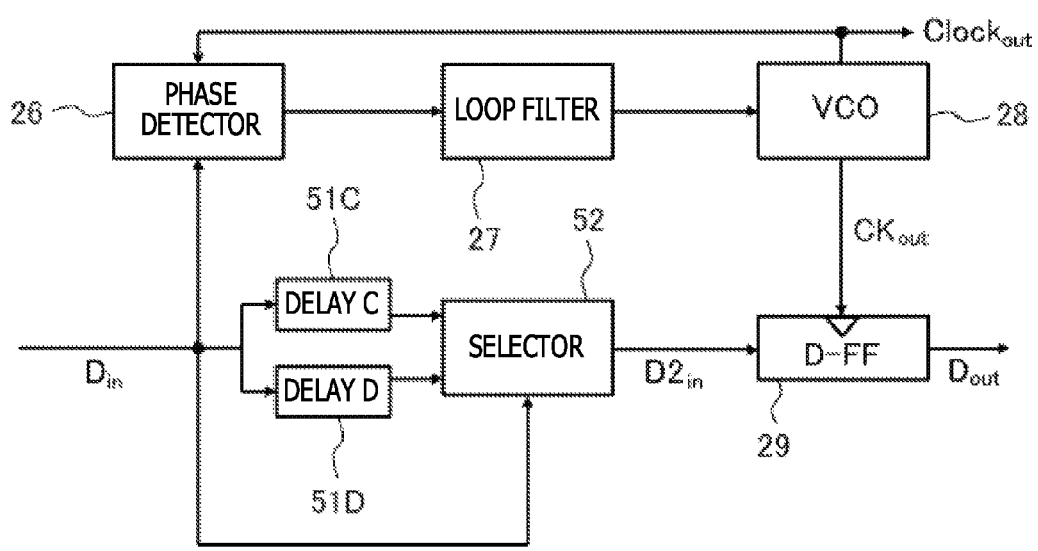
FIG. 17 illustrates a configuration of a signal recovery circuit in a receiver of a fifth exemplary embodiment.

FIG. 17 illustrates a configuration of a signal recovery circuit in a receiver of the fifth exemplary embodiment.

The signal recovery circuit of the fifth exemplary embodiment is different from that of the first exemplary embodiment in terms of being provided with a delay C 51C, a delay D 51D and a selector 52 as a phase adjustment circuit 30, while being the same in the remaining part.

The delay C 51C delays a received data signal $D_{in}$ by a delayed amount C to output a first delayed received data signal, and the delay D 51D delays the received data signal $D_{in}$ by a delayed amount D smaller than the delayed amount C to output a second delayed received data signal. The difference between the delayed amount C and the delayed amount D is a time difference between the time when sampling 1 and the time when sampling 0 as illustrated in FIG. 6. The delay C 51C and the delay D 51D are implemented in the form of signal lines and are configured such that a difference in length between the signal lines corresponds to a difference between the delayed amount C and the delayed amount D.

According to the data value of the received data signal $D_{in}$, the selector (52) selects any of the first delayed received data signal and the second delayed received data signal outputted from the delay C 51C and the delay D 51D to output as an adjustment-completed received data signal $D2_{in}$. Specifically, when the data value of the received data signal $D_{in}$ desired to be received is equal to 1, the first delayed received data signal is selected and when the data value is equal to 0, the second delayed received data signal is selected. The circuit configuration of the selector 52 will be described below.

The signal recovery circuit of the fifth exemplary embodiment is different in circuit configuration from that of the second and fourth exemplary embodiments while resulting in the same effect as that of the second and fourth exemplary embodiments. Also, the signal recovery circuit of the fifth exemplary embodiment may be provided with a readjustment circuit (D-FFS) 32, as in the signal recovery circuit of the third exemplary embodiment.

Figure 18:
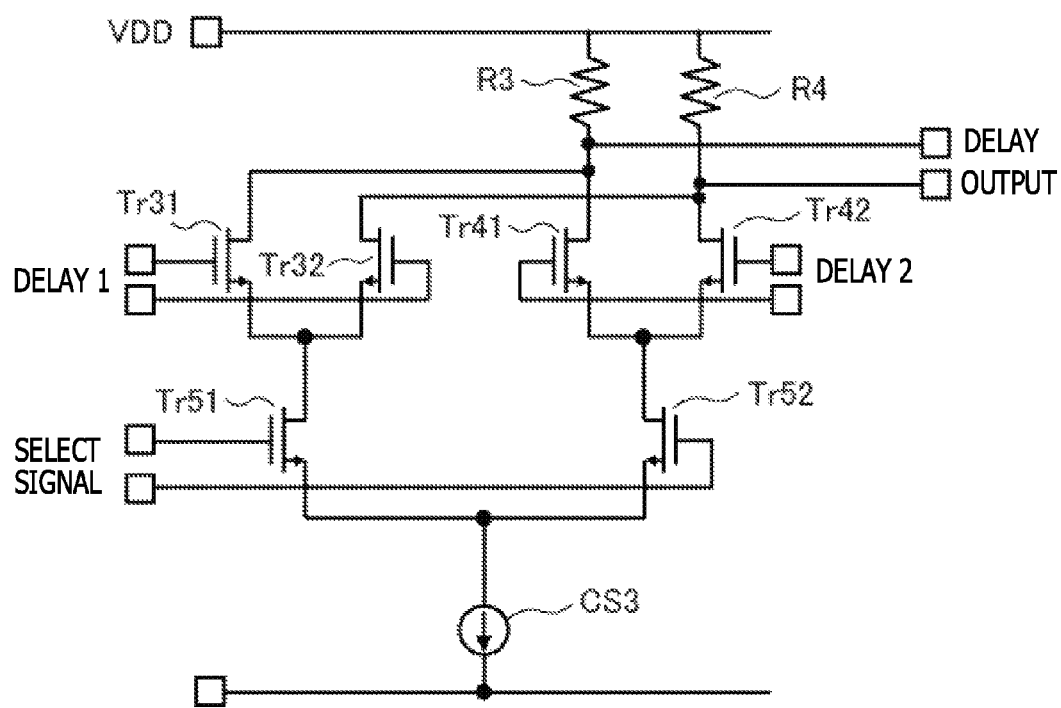
FIG. 18 illustrates a circuit configuration of a selector 42 in the fourth exemplary circuit and a selector used in the fifth exemplary embodiment.

FIG. 18 illustrates a circuit configuration of a selector used as the selector 42 of the fourth exemplary embodiment and as the selector 52 of the fifth exemplary embodiment.

As described above, for purposes of facilitating the illustration, an electrical signal is represented as a single phase signal in the drawings mentioned above, except FIG. 8. However, a differential electrical signal is preferably used. FIG. 18 illustrates a circuit diagram for a differential signal. To facilitate an understanding among those skilled in the art, however, the circuit of FIG. 8 may be represented in a circuit diagram for a single phase signal.

The selector includes common load resistors R3 and R4, a third differential pair of transistors Tr31 and Tr32, a fourth differential pair of transistors Tr41 and Tr42, a fifth differential pair of transistors Tr51 and Tr52, and a constant current source CS3. The series-connected third differential pair and Tr51 of the fifth differential pair and the series-connected fourth differential pair and Tr52 are connected in parallel to each other and are connected in series to R1 and R2 and CS3 between power supplies VDD and GND. To the third differential pair, an output from the delay A 41A or the delay C 51C is inputted as Delay 1, to the fourth differential pair, an output from the delay B 41B or the delay D 51D is inputted as Delay 2, and to the fifth differential pair, $D_{in}$ is inputted as a select signal. $CK2_{out}$ or $D2_{in}$ is outputted as a delay output from connection nodes between the third and fourth differential pairs of transistors and the common load resistors R3 and R4.

The circuit illustrated in FIG. 18 is an analog selector circuit that selects Delay 1 and Delay 2 according to a select signal to output. Detailed descriptions of the operation of the selector will be omitted.

Figure 19:
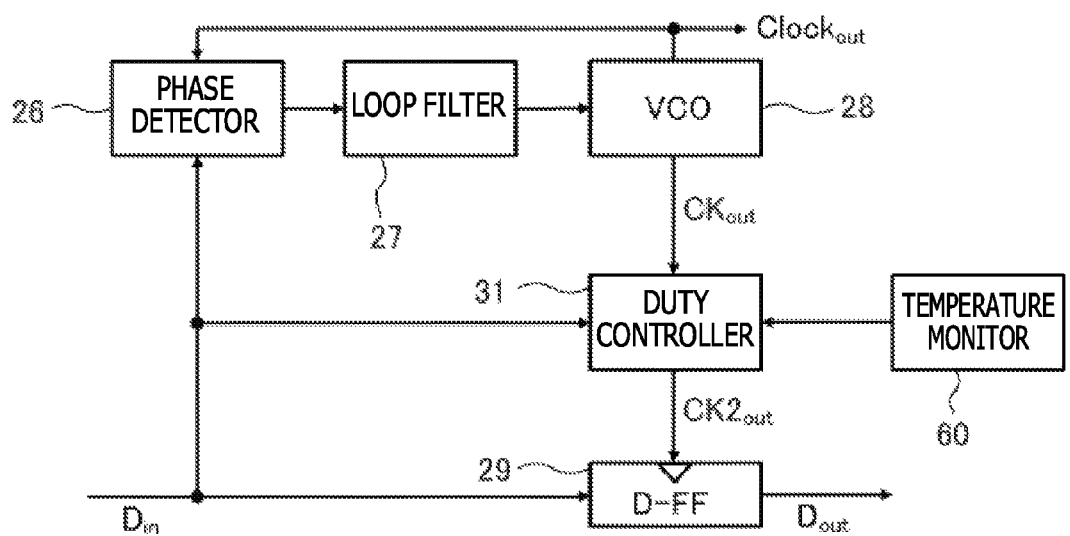
FIG. 19 illustrates a configuration of a signal recovery circuit in a receiver of a sixth exemplary embodiment.

FIG. 19 illustrates a configuration of a signal recovery circuit in a receiver of a sixth exemplary embodiment.

The signal recovery circuit of the sixth exemplary embodiment is different from that of the second exemplary embodiment in terms of being further provided with a temperature monitor 60, while being the same in the remaining part.

A peaking caused due to the attenuated oscillation of an LD 12 in a transmitter 10 or a mismatch between the rising time Tr and the falling time Tf illustrated in FIG. 12 depends on, for example, temperature. Therefore, the optimum timing for retiming of level 1 and level 0 varies with a variation in temperature.

In the sixth exemplary embodiment, according to the summing ratio of a received data signal $D_{in}$ and a received signal recovery clod $CK_{out}$, a duty controller 31 is able to adjust the clock duty of an adjustment-completed received signal recovery clock $CK2_{out}$, i.e., the advanced amount and delayed amount of the timing for retiming. Therefore, the temperature is monitored and the summing ratio at the duty controller 31 is adjusted depending on the monitored temperature, thereby offsetting a temperature-dependent variation in the LD 12.

The sixth exemplary embodiment may be applied to a configuration wherein the transmitter 10 and the receiver 20 are provided close to each other and the temperature of the LD 12 in the transmitter 10 may be predicted based on a temperature detected by the temperature monitor 60. Further, it may be applied to a configuration wherein the temperature monitor 60 is provided in the vicinity of the LD 12 in the transmitter 10, and temperature information detected by the temperature monitor 60 is transmitted in a transmission signal from the transmitter 10 to the receiver 20 to supply the temperature information to the duty controller 31.

Also, a training mode is performed at the time of initialization or frequently to measure the error rate, and the delayed amount at the duty controller 31 may be adjusted such that the error rate is minimized, i.e., to reach the optimum condition.

The configuration of the sixth exemplary embodiment wherein the temperature monitor is provided may also be applied in the third to fifth exemplary embodiments.

Although exemplary embodiments are described above, it is also possible to make modifications. In the exemplary embodiments, the phase of a received signal recovery clock and/or a received data signal is adjusted according to the data value of an acquired received data signal. Therefore, it is required that the data value of the acquired received data signal be reflected in the phase adjustment of the received signal recovery clock and/or received data signal involved in the acquisition of the data value. Therefore, for example, in FIG. 5, a delay circuit may be provided on a path of $CK_{out}$ between the VCO 28 and the duty controller 31 and a path of $D_{in}$ inputted into the acquisition circuit to fully reflect the data value of the acquired received data signal. In that event, it is preferable to provide a readjustment circuit, as in the third exemplary embodiment. The same may be applied in the fourth to sixth exemplary embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A signal recovery circuit comprising:
a data acquisition circuit configured to collect a received data signal according to a transition edge of a received signal recovery clock; and
a phase adjustment circuit configured to adjust a phase relationship between the transition edge of the received signal recovery clock and the received data signal according to a data value of the received data signal to be acquired by the data acquisition circuit, wherein
the phase adjustment circuit comprises a clock phase adjustment circuit configured to generate an adjustment-completed received signal recovery clock by adjusting a phase of the transition edge of the received signal recovery clock according to the data value of the received data signal to be acquired by the data acquisition circuit,
the data acquisition circuit acquires the received data signal according to the transition edge of the adjustment-completed received signal recovery clock,
the received data signal is a signal received in the form of an optical signal by direct laser modulation, and
the clock phase adjustment signal is configured to make the transition edge of the received signal recovery clock faster when the received data signal has a level of 1 and make the transition edge of the received signal recovery clock slower when the received data signal has a level of 0.

2. The signal recovery circuit according to claim 1, wherein
the clock phase adjustment circuit is an adder circuit for summing up the received signal recovery clock and the received data signal.

3. The signal recovery circuit according to claim 1, wherein
the clock phase adjustment circuit comprises a limit amplifier circuit configured to perform amplifying by limiting the strength range of an output from the adder circuit.

4. The signal recovery circuit according to claim 1, wherein
the phase adjustment circuit further comprises: a first delay circuit configured to delay the received signal recovery clock by a first delay amount; a second delay circuit configured to delay the received signal recovery clock by a second delay amount different from the first delay amount; and a selector circuit configured to delay one of an output from the first delay circuit and an output from the second delay circuit according to the data value of the received data signal to be acquired by the data acquisition circuit.

5. The signal recovery circuit according to claim 1, further comprising:

a timing circuit configured to acquire an output from the data acquisition circuit according to a clock in an inverse form of the received signal recovery clock.

6. The signal recovery circuit according to claim 1, wherein
the phase adjustment circuit further comprises a data delay adjustment circuit that is configured to adjust a delay amount of the received data signal according to the data value of the received data signal to be acquired by the data acquisition circuit, wherein the data acquisition circuit acquires the received data signal whose delay amount has been adjusted at the data delay adjustment circuit according to the transition edge of the received signal recovery clock.

7. The signal recovery circuit according to claim 6, wherein
the data delay adjustment circuit is configured to delay the received data signal when the received data signal to be acquired by the data acquisition circuit has a level of 1 as compared to when it has a level of 0.

8. The signal recovery circuit according to claim 6, wherein
the data delay adjustment circuit includes:
a first delay circuit configured to delay the received data signal by a first delay amount;
a second delay circuit configured to delay the received signal recovery clock by a second delay amount different from the first delay amount; and
a selector circuit configured to delay one of an output from the first delay circuit and an output from the second delay circuit according to the data value of the received data signal to be acquired by the data acquisition circuit.

9. The signal recovery circuit according to claim 1, further comprising:
a clock and data recovery circuit (CDR) configured to recover the received signal recovery clock from the received data signal.

10. A signal recovery method comprising:
receiving an optical signal generated by direct laser modulation to generate a received data signal;
adjusting a phase relationship between a transition edge of a received signal recovery clock and the received data signal according to a data value of the received data signal;
acquiring the received data signal according to the transition edge of the received signal recovery clock;
generating an adjustment-completed received signal recovery clock by adjusting a phase of the transition edge of the received signal recovery clock according to the data value of the received data signal;
acquiring the received data signal according to the transition edge of the adjustment-completed received signal recovery clock;
making the transition edge of the received signal recovery clock faster when the received data signal has a level of 1; and
making the transition edge of the received signal recovery clock slower when the received data signal has a level of 0.

11. An optical communication system comprising:
a transmitter circuit configured to generate an optical signal according to a transmitted signal by direct laser modulation and output the optical signal;
a transmission path configured to transmit the optical signal; and a receiver circuit configured to receive the optical signal and recover a received data corresponding to the transmitted data signal, wherein the receiver circuit includes:

a receiving part configured to generate a received data signal from the optical signal received from the transmission path;

a data acquisition circuit configured to acquire the received data signal according to a transition edge of a received signal recovery clock; and a phase adjustment circuit configured to adjust a phase relationship between the transition edge of the received signal recovery clock and the received data signal according to the data value of the received data signal to be acquired by the data acquisition circuit, wherein the phase adjustment circuit comprises a clock phase adjustment circuit configured to generate an adjustment-completed received signal recovery clock by adjusting a phase of the transition edge of the received signal recovery clock according to the data value of the received data signal to be acquired by the data acquisition circuit, the data acquisition circuit acquires the received data signal according to the transition edge of the adjustment-completed received signal recovery clock, the received data signal is a signal received in the form of an optical signal by direct laser modulation, and the clock phase adjustment signal is configured to make the transition edge of the received signal recovery clock faster when the received data signal has a level of 1 and make the transition edge of the received signal recovery clock slower when the received data signal has a level of 0.

* * * * *